Figure 1:
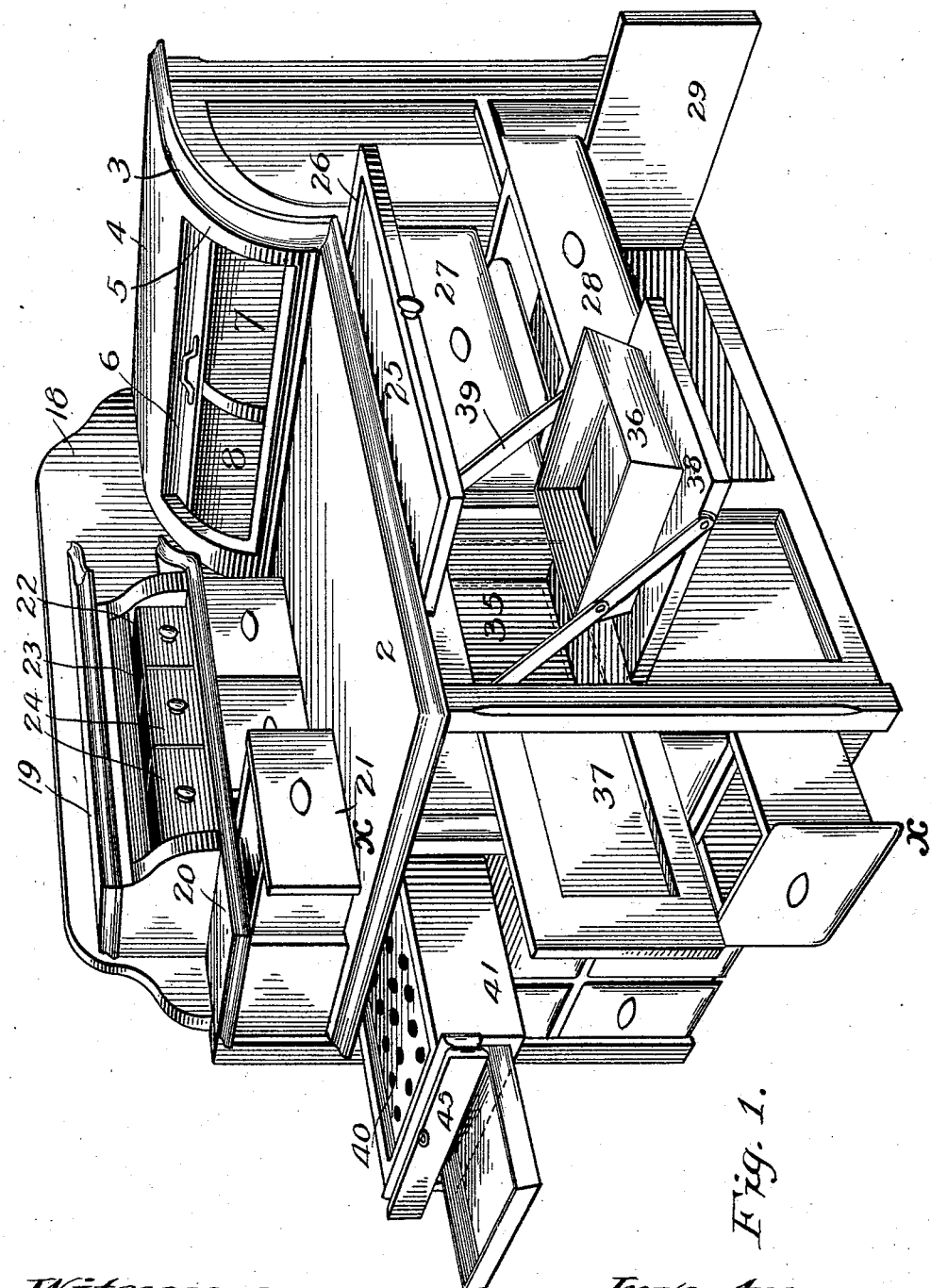

(No Model.) 3 Sheets—Sheet 1.
J. BERNTSEN.
KITCHEN CABINET.

No. 536,258. Patented Mar. 26, 1895.

Witnesses:
Chas. E. Van Dorn.
W. E. Gooley

Inventor,
John Berntsen.
By Paul & Hawley
his Attorneys.

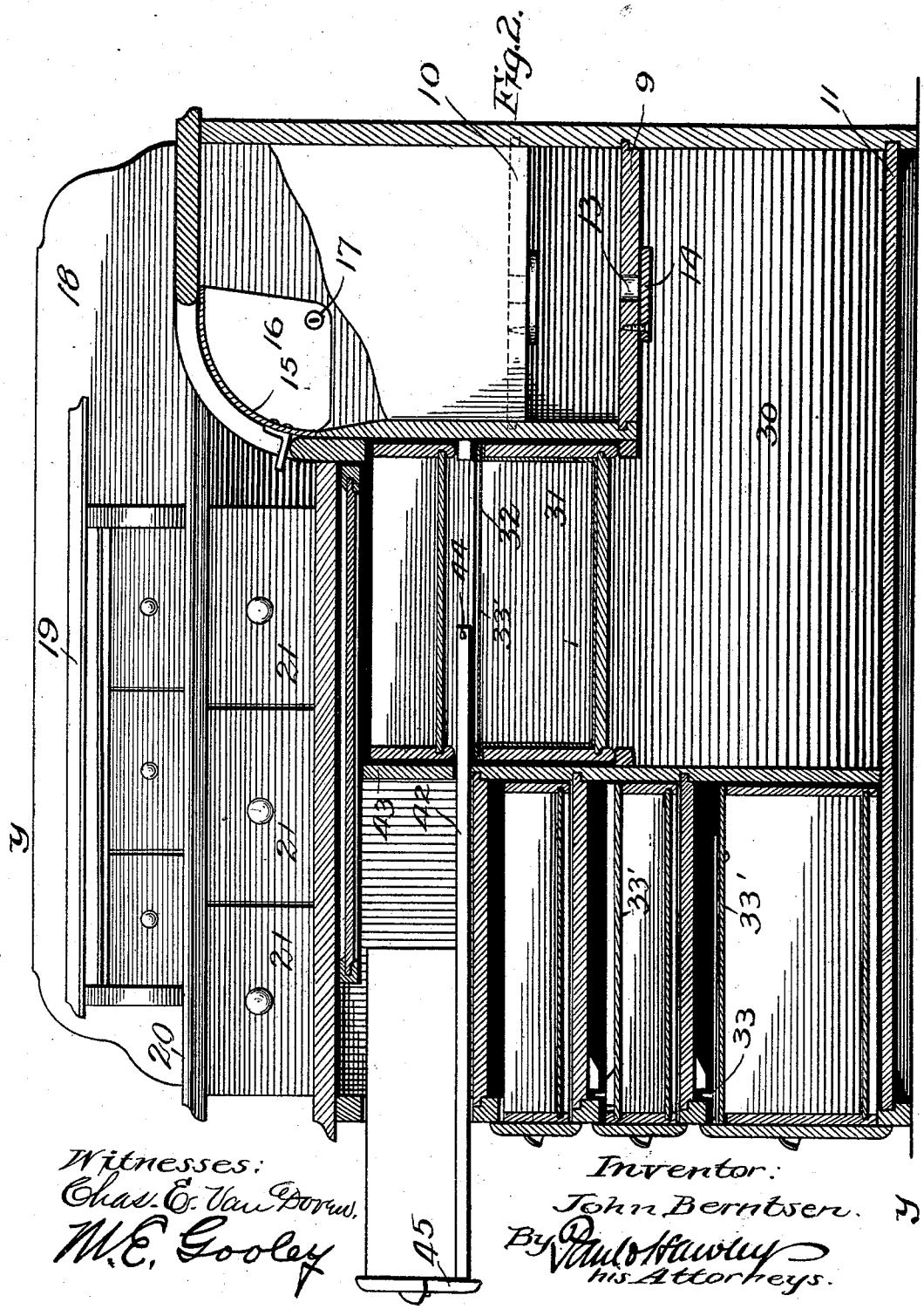

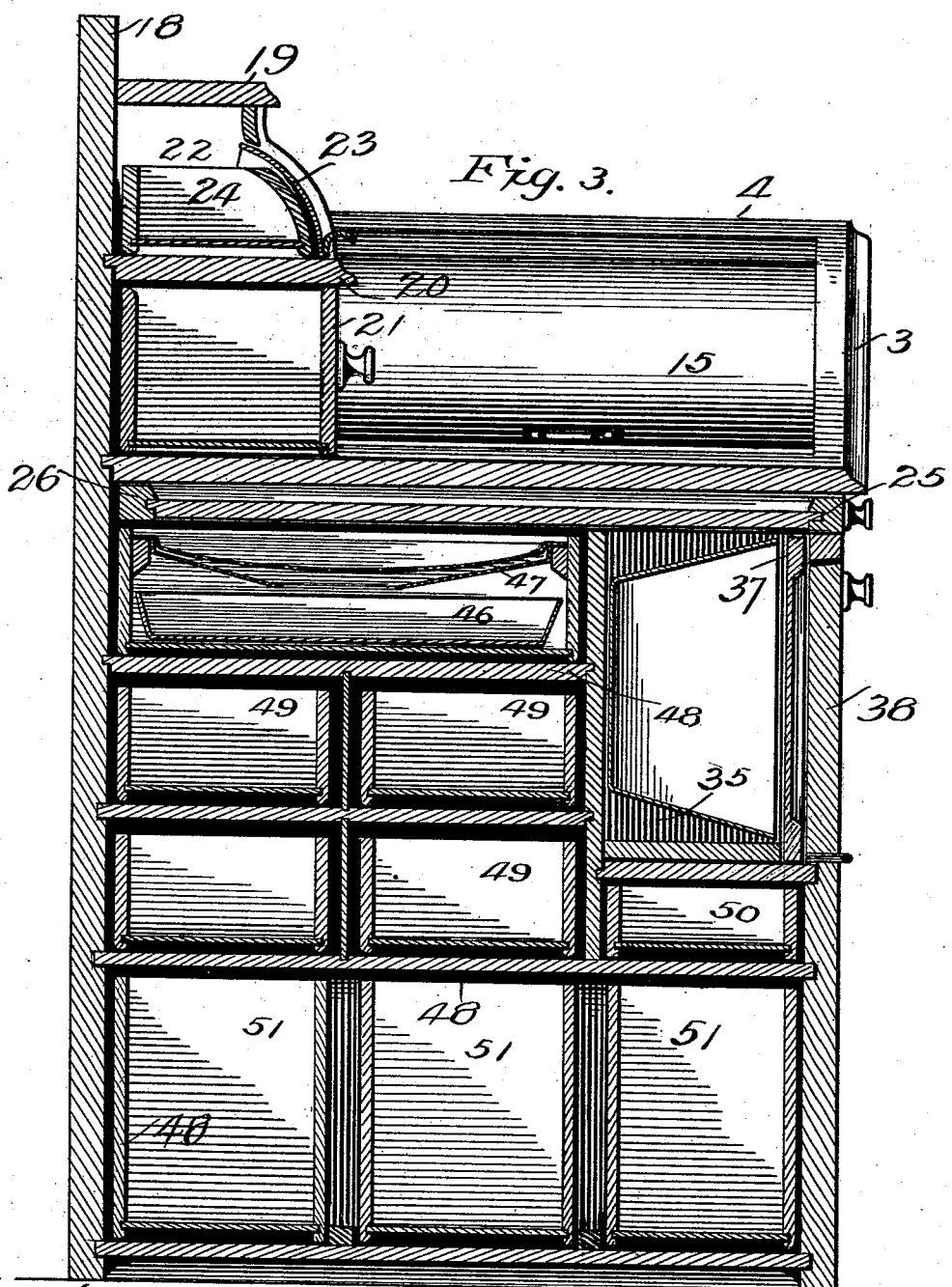

UNITED STATES PATENT OFFICE.

JOHN BERNTSEN, OF ALBERT LEA, MINNESOTA.

KITCHEN-CABINET.

SPECIFICATION forming part of Letters Patent No. 536,258, dated March 26, 1895.

Application filed May 24, 1894. Serial No. 512,251. (No model.)

*To all whom it may concern:*

Be it known that I, JOHN BERNTSEN, of Albert Lea, in the county of Freeborn and State of Minnesota, have invented certain new and useful Improvements in Kitchen-Cabinets, of which the following is a specification.

My invention relates to a kitchen cabinet of a new and improved construction, and of a degree of usefulness hitherto unattained.

The object of my invention is to provide a kitchen cabinet which will occupy a very small space and yet which will represent a large number of drawers and compartments for particular purposes.

The general object which I have in view is to provide a kitchen cabinet all parts of which will be easy of access and in most convenient forms.

To this end my invention consists in a kitchen cabinet of the construction and combination of parts all as hereinafter described and particularly pointed out in the claims.

The invention will be more readily understood by reference to the accompanying drawings, forming a part of this specification, and in which—

Figure 1 is a perspective view showing a kitchen cabinet embodying my invention, certain parts thereof being drawn out to more fully illustrate their construction and the uses thereof. Fig. 2 is an enlarged vertical and longitudinal section of the cabinet substantially on the plane of the line $x-x$ of Fig. 1. Fig. 3 is a still further enlarged transverse section on the line $y-y$ of Fig. 2.

As shown in the drawings, the main frame of the cabinet is rectangular in form, 2 representing a large, flat top therefor at the right-hand end of which is a raised portion 3, the top 4 of which is flat, while the inner end is in the form of a curve 5 wherein the large opening 6 is provided. Beneath this end and within the end of the casing I provide the two large flour spaces or cases 7 and 8. The bottoms of these spaces are formed by intermediate floors 9 and 10 (see Fig. 2) the lower one being a considerable distance above the main bottom 11 of the cabinet, while the floor 10 is some distance above the floor 9. In each bottom 9 and 10 I preferably provide a clean-out hole 13 closed by a slide 14. The opening 6 is closed by the curved board or curtain 15 having the ends 16 pivoted on the screws 17 within the ends of the cases.

The particular form of the top of the flour bins renders the same most convenient as a large, flat surface is provided, while hinged lids which must be cleared before access may be had to the flour bins, are dispensed with.

The back 18 of the cabinet is preferably extended up some distance above the flour bins, and two shelves 19 and 20 are provided thereon. Beneath the lower shelf I provide three drawers 21 to receive various articles, while between the shelf 20 and the shelf 19 a space 22 adapted to be closed by a curtain 23 and to contain three or more drawers 24 is provided. These drawers are adapted to contain spices, and hence the use of the curtain 23.

Just beneath the top 2 of the cabinet I arrange the molding board 25 adapted to slide in or out and having the frame 26 which is raised around the edge of the board to prevent crumbs falling therefrom. Beneath the board are two drawers 27 and 28, and beneath the lower drawer and in the front of the cabinet I provide the door 29 through which access may be had to the large space 30 beneath the drawer and beneath the floor 9, and wherein a large number of kettles and like articles may be stored. The floor 11 is preferably on a level with the bottom of the door 29, so that the space may be easily kept clean.

The drawer 28 is especially provided to contain bread, and has a tin lining 31 and also a tin cover 32. This cover has on its top one or more lugs similar to the lugs 33 (see Fig. 2) adapted to engage stops within the casing of the cabinet so that the cover remains stationary while the drawers may be drawn out or pushed in at will. When the drawer is pushed in, the tin bread-box will be completed and will be practically air tight.

The drawers 27 and 28 do not occupy the full space beneath the board 25, but are narrow enough to admit the use of the box 35 formed in the corner of the cabinet and adapted to receive the dish-pan 36 when the same is not in use. When the pan is placed within the box or small casing 35, it may be concealed from view and also held in place by a vertical slide 37 adapted to be slipped in in front of the same.

A space or opening is provided in the front of the cabinet to be closed by the hinged shelf 38 which, when down in the position shown in Fig. 1, is supported by the link straps 39 and is adapted to hold the dish-pan. This shelf is at a convenient height for the use of the dish-pan thereon. Dishes taken from the pan 37 are placed upon the draining board 40 provided in the top of the large drawer 41 arranged in the end of the cabinet. This drawer is of as great a width as possible and to support the same when it is drawn out, I preferably employ one or more long rods or bars 42 attached to the under side of the drawer and extending through suitable openings in the middle transverse partition 43 within the cabinet. A stop pin 44 is preferably provided in the end of the bar 42 to prevent the drawer from being drawn clear out. The drawer has a small, hinged door 45 in its outer end and is of such a depth as to admit the pan 46 adapted to receive the water dripping from the dishes. I preferably provide the small draining hopper 47 beneath the perforated drain-board or plate 40 to carry the water down into the pan.

The space beneath the dish-pan compartment or box 35 and beneath the dish-draining drawer is cut up into a number of compartments by the horizontal and vertical partitions 48, these compartments being occupied by four drawers 49, by the small drawer 50, and by the large deep drawers 51 provided at the bottom and which may be separated by vertical partitions if desired. All of these drawers are preferably provided with stationary covers 33', as shown in Fig. 2, the same remaining stationary while the drawers are moved, and adapted to close the tops of the drawers when the same are pushed in.

Having thus described my invention, I claim as new and desire to secure by Letters Patent—

1. A kitchen cabinet, consisting of the main frame having the flat top 2, the shelf 20 arranged above said flat top, the spice drawers upon said shelf, the curtain concealing the same, the drawers 21 beneath said shelf, the raised flat portion 4 at one end of said main frame, the flour bins arranged beneath said flat portion, the curtain 6 concealing the opening leading to said flour bins, said flour bins being provided with an opening 13 in the bottom thereof and a slide or flap 14 to cover the same, the mold board beneath said flat top 2, the drawers 27 and 28 arranged beneath said mold board, said drawer 28 being provided with a metal covering with respect to which the drawer 28 is slidable, the kettle space beneath said flour bins and said drawer 28, the door 38 arranged to conceal an opening within said main frame for receiving the pan 36, and said door being also arranged to support said pan when it is in use, a sliding door 37 and the drawers 49, 50 and 51 provided in the end of said main frame beneath said flat top 2, for the purpose specified.

2. A kitchen cabinet, consisting of a main frame or casing having the flat top 2, and a raised portion at one end having a curved inner face and a flat top 4, the flour bins arranged beneath said flat top 4, the curtain 6 concealing the opening leading to the same, the mold board 25, the drawers 27 and 28 beneath said mold board, said drawer 28 being metal lined and provided with a sliding metal cover, the kettle space beneath said drawers and flour bin, the box or opening 35 arranged beneath said mold board for receiving the dish pan 36, the hinged door 38 for supporting said dish pan when in use, the vertical slide 37 for concealing the box or opening 35, the drawers 49, 50 and 51 provided in the end of said main frame or casing, and the drawer 41 having the perforated draining board arranged in the top thereof, the hopper beneath the same, and the pan 46 for receiving the drippings from said hopper, the bars 42 for supporting said drawer 41, said bars being provided with stops to prevent their being drawn out too far, and the lower portion of the outer end of said drawer being hinged to permit the removal of said pan 46, substantially as described.

In testimony whereof I have hereunto set my hand this 19th day of May, A. D. 1894.

JOHN BERNTSEN.

In presence of—
I. L. INGBRITSIN,
HERMAN BLACKMER.